(12) United States Patent
Nomura

(10) Patent No.: US 9,500,495 B2
(45) Date of Patent: Nov. 22, 2016

(54) VEHICULAR NAVIGATION SYSTEM

(71) Applicant: DENSO CORPORATION, Kariya, Aichi-pref. (JP)

(72) Inventor: Tomoo Nomura, Nagoya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/420,414

(22) PCT Filed: Oct. 3, 2013

(86) PCT No.: PCT/JP2013/005902
§ 371 (c)(1),
(2) Date: Feb. 9, 2015

(87) PCT Pub. No.: WO2014/054288
PCT Pub. Date: Apr. 10, 2014

(65) Prior Publication Data
US 2015/0211879 A1 Jul. 30, 2015

(30) Foreign Application Priority Data

Oct. 3, 2012 (JP) .................................. 2012-221642
Oct. 3, 2012 (JP) .................................. 2012-221643
Oct. 3, 2012 (JP) .................................. 2012-221644

(51) Int. Cl.
*G01C 21/10* (2006.01)
*G01C 21/36* (2006.01)
(Continued)

(52) U.S. Cl.
CPC ......... *G01C 21/3647* (2013.01); *G08G 1/0969* (2013.01); *G08G 1/161* (2013.01); *H04W 4/046* (2013.01); *H04W 4/02* (2013.01)

(58) Field of Classification Search
CPC ................ G08G 1/161; G08G 1/0969; H04W 4/046; H04W 4/02; G01C 21/3647
(Continued)

(56) References Cited

U.S. PATENT DOCUMENTS

2009/0182497 A1 7/2009 Hagiwara
2010/0121561 A1* 5/2010 Kodaira ................. G01C 11/02
701/532
(Continued)

FOREIGN PATENT DOCUMENTS

| JP | 2000-013681 A | 1/2000 |
| JP | 2001-043458 A | 2/2001 |
| JP | 2005-214857 A | 8/2005 |
| JP | 2007-256048 A | 10/2007 |

(Continued)

OTHER PUBLICATIONS

International Search Report of the International Searching Authority mailed Nov. 5, 2013 for the corresponding international application No. PCT/JP2013/005902 (and English translation).

(Continued)

*Primary Examiner* — Calvin Cheung
*Assistant Examiner* — Paula L Schneider
(74) *Attorney, Agent, or Firm* — Posz Law Group, PLC

(57) ABSTRACT

A vehicle unit in a vehicle determines whether the driver has encountered a difficult spot, which is difficult to understand, based on the deviation from a route, the behavior of the vehicle, and the behavior of the driver. A standard for determining the difficult spot can be corrected by learning. The vehicle unit acquires a raw image picked up at the difficult spot. The raw image is used to verify the determination of the difficult spot. The vehicle unit transmits the raw image to a center unit in a distribution center. The center unit creates a clean image based on a plurality of raw images transmitted from a plurality of vehicles. The clean image that does not show moving objects such as pedestrians and other vehicles is distributed to a succeeding vehicle arriving at the difficult spot. The vehicle unit displays the distributed clean image as a guidance image.

23 Claims, 8 Drawing Sheets

(51) Int. Cl.
    *G08G 1/16*      (2006.01)
    *H04W 4/04*      (2009.01)
    *G08G 1/0969*    (2006.01)
    *H04W 4/02*      (2009.01)

(58) Field of Classification Search
    USPC ......................................................... 701/523
    See application file for complete search history.

(56) References Cited

U.S. PATENT DOCUMENTS

2013/0311641 A1* 11/2013 Chow ...................... G08G 1/04
                                                     709/224
2015/0228194 A1    8/2015 Nomura

FOREIGN PATENT DOCUMENTS

| | | |
|---|---|---|
| JP | 2008-185394 A | 8/2008 |
| JP | 2009-008646 A | 1/2009 |
| JP | 2012-060299 A | 3/2012 |
| WO | 2014/054289 A1 | 4/2014 |

OTHER PUBLICATIONS

Written Opinion of the International Searching Authority mailed Nov. 5, 2013 for the corresponding international application No. PCT/JP2013/005902 (and English translation).
U.S. Appl. No. 14/428,121, filed Mar. 13, 2015, Denso Corporation.
Office Action issued Mar. 1, 2016 in the corresponding JP application No. 2012-221642 (with English translation).

* cited by examiner

VEHICULAR NAVIGATION SYSTEM

CROSS REFERENCE TO RELATED APPLICATIONS

The present disclosure is a U.S. national stage application of International Patent Application No. PCT/JP2013/005902 filed on Oct. 3, 2013 and is based on Japanese Patent Application No. 2012-221642 filed on Oct. 3, 2012, Japanese Patent Application No. 2012-221643 filed on Oct. 3, 2012, and Japanese Patent Application No. 2012-221644 filed on Oct. 3, 2012, the disclosures of which are incorporated herein by reference.

BACKGROUND

The present disclosure relates to a vehicular navigation system that presents navigation images to a vehicle running on a road.

Disclosed in Patent Literature 1 is a navigation system that collects movies of an ambiguous fork in a road from a plurality of vehicles and presents the ambiguous fork to a running vehicle.

PATENT LITERATURE

Patent Literature 1: JP 2008-185394 A

SUMMARY

Conventional technologies determine an ambiguous fork in a road only when a vehicle deviates from a guiding route. An ambiguous fork may be referred to as a difficult spot that makes it difficult for a driver to understand a road structure or a course. The conventional technologies may fail to extract a difficult spot. In view of the above circumstances, it is demanded that the vehicular navigation system be further improved.

It is an object of the present disclosure to provide a vehicular navigation system that is capable of automatically extracting a difficult spot and presenting an image easily understood by a driver at the difficult spot.

It is another object of the present disclosure to provide a vehicular navigation system that is capable of determining a difficult spot with high accuracy.

According to an example of the present disclosure, a vehicular navigation system is provided to include a determination section and a supply section. The determination section determines a difficult spot on a road based on a behavior of a vehicle and/or a behavior of a driver of the vehicle, the difficult spot being a spot that hinders the driver from properly understanding a road structure or a course. The supply section supplies, based on a raw image picked up at the difficult spot, an image for providing assistance in driving at the difficult spot.

According to the above configuration, an image for providing assistance in driving at a difficult spot can be presented based on a raw image picked up at the difficult spot. Therefore, an image for providing assistance in driving is presented based on an actual scene at the difficult spot. Further, the difficult spot is determined based on the behavior of a vehicle and/or the behavior of a driver. As the difficult spot is automatically determined, the image for providing assistance in driving can be automatically presented.

According to another example of the present disclosure, a vehicular navigation system is provided to include a determination section, a learning section, and a supply section. The determination section determines a difficult spot on a road by comparing a behavior of a vehicle and/or a behavior of a driver of the vehicle against a standard, the difficult spot being a spot that hinders the driver from properly understanding a road structure or a course. The learning section corrects the standard based on the behavior of the vehicle and/or the behavior of the driver observed at the difficult spot. The supply section supplies, based on a raw image picked up at the difficult spot, an image for providing assistance in driving at the difficult spot.

According to the above configuration, an image for providing assistance in driving at a difficult spot can be presented based on a raw image picked up at the difficult spot. Therefore, an image for providing assistance in driving is presented based on an actual scene at the difficult spot. Further, the difficult spot is determined based on the behavior of a vehicle and/or the behavior of a driver. As the difficult spot is automatically determined, the image for providing assistance in driving can be automatically presented. Furthermore, a standard for determining the difficult spot is corrected by a learning section. This makes it possible to increase the accuracy of determining the difficult spot.

According to yet another example of the present disclosure, a vehicular navigation system is provided to include a determination section, a verification section, and a supply section. The determination section determines a difficult spot on a road based on a behavior of a vehicle and/or a behavior of a driver of the vehicle, the difficult spot being a spot that hinders the driver from properly understanding a road structure or a course. The verification section verifies the determining of the determination section by determining whether a raw image picked up at the difficult spot shows an error object, the error object being to be shown in the raw image due to a factor irrelevant to the difficult spot. The supply section supplies, based on the raw image, an image for providing assistance in driving at the difficult spot when the verification section verifies that the determining of the difficult spot is correct.

According to the above configuration, an image for providing assistance in driving at a difficult spot can be presented based on a raw image picked up at the difficult spot. Therefore, an image for providing assistance in driving is presented based on an actual scene at the difficult spot. Further, the difficult spot is determined based on the behavior of a vehicle and/or the behavior of a driver. As the difficult spot is automatically determined, the image for providing assistance in driving can be automatically presented. Furthermore, the determination of the difficult spot is verified based on the raw image. This verification is made by determining whether an error object is shown in the raw image due to a factor irrelevant to the difficult spot. This makes it possible to increase the accuracy of determining the difficult spot.

BRIEF DESCRIPTION OF DRAWINGS

The above and other objects, features and advantages of the present disclosure will become more apparent from the following detailed description made with reference to the accompanying drawings. In the drawings.

DETAILED DESCRIPTION

Figure 1:
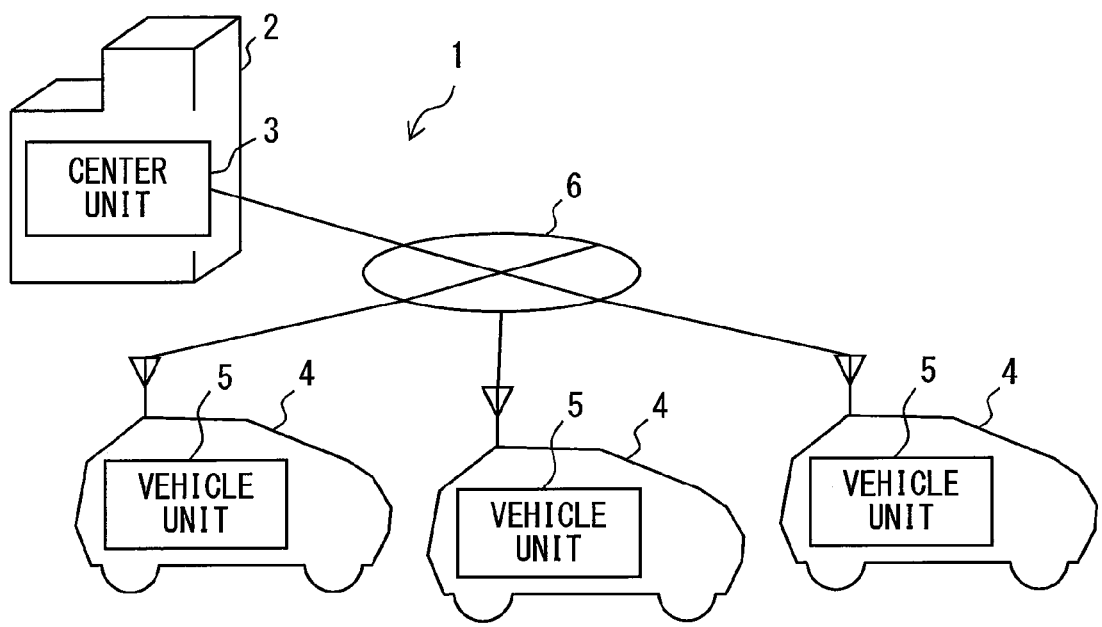
FIG. 1 is a block diagram illustrating a system according to a first embodiment of the present disclosure.

Embodiments of the present disclosure will now be described with reference to the accompanying drawings. In the following description of the embodiments, portions equivalent to each other may be designated by the same reference numerals and not redundantly described for brevity of explanation. If only some of elements included in a certain embodiment are described, the other elements may be defined as described in conjunction with a foregoing embodiment. Further, some elements included in a later-described embodiment may be designated by a reference numeral that differs only in a digit in hundreds place from a corresponding reference numeral assigned to elements included in a foregoing embodiment in order to indicate the relationship between the elements and avoid a redundant explanation. It goes without saying that portions of different embodiments can be combined as far as they are explicitly defined to be combinable. However, even if portions of different embodiments are not explicitly defined to be combinable, they may also be combinable as far as their combination does not cause any issue.

First Embodiment

As shown in FIG. 1, a first embodiment of the present disclosure is a vehicular navigation system 1. The vehicular navigation system 1 is formed of a distribution center 2 and a plurality of vehicles 4. The distribution center 2 includes a center unit 3. The vehicles 4 each include a vehicle unit 5. A communication system 6 for data communication is provided between the center unit 3 and the vehicle unit 5. The center unit 3 is connected to a plurality of vehicle units 5 through the communication system 6 in such a manner as to establish data communication. The communication system 6 may include a network such as a wireless telephone circuit and the Internet. The center unit 3 and the vehicle unit 5 form the vehicular navigation system 1. A vehicle in which the vehicle unit 5 is mounted may also be referred to as a host vehicle or a subject vehicle.

The center unit 3 distributes a guidance image to the plurality of vehicle units 5. The image to be distributed is a still image or a movie. The plurality of vehicle units 5 receive the distributed image. Each vehicle unit 5 may be implemented by a navigation unit mounted in a vehicle 4. The navigation unit displays the distributed image to present it to a driver of the vehicle 4 for the purpose of assisting the driver in driving the vehicle 4. The plurality of vehicle units 5 transmit, to the center unit 3, the images picked up in the respective vehicles 4 in which they are mounted. The center unit 3 collects the images transmitted from the plurality of vehicle units 5 and processes the collected images to create an image to be distributed. The vehicular navigation system 1 processes the images collected from the plurality of vehicle units 5 and distributes the resulting image.

Figure 2:
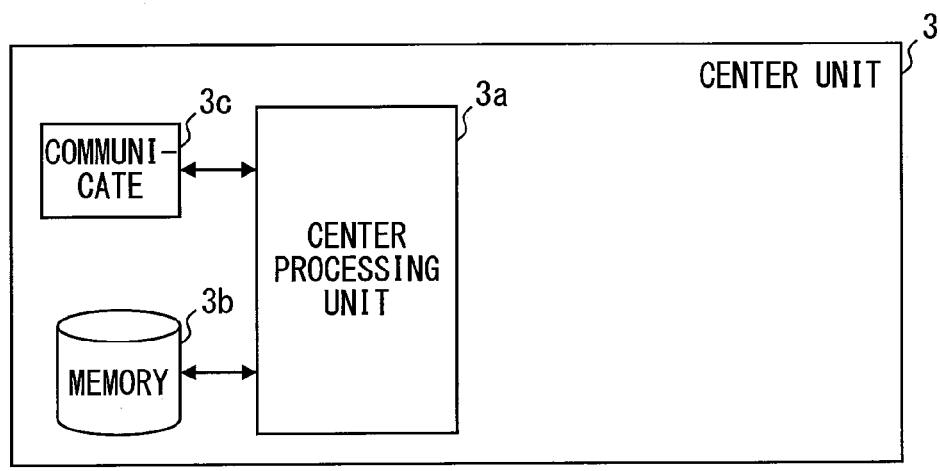
FIG. 2 is a block diagram illustrating a center unit according to the first embodiment.

As shown in FIG. 2, the center unit 3 includes a center processing unit 3a and a memory unit 3b. The memory unit 3b is a storage unit that stores data. The center processing unit 3a and the memory unit 3b form a microcomputer. The center unit 3 includes a communication instrument 3c that provides connection to the communication system 6.

Figure 3:
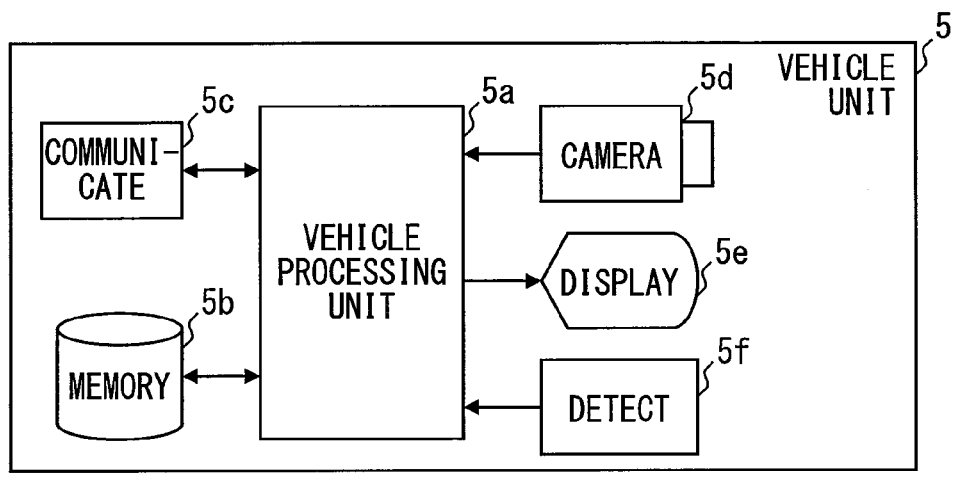
FIG. 3 is a block diagram illustrating a vehicle unit according to the first embodiment.

As shown in FIG. 3, the vehicle unit 5 includes a vehicle processing unit 5a and a memory unit 5b. The memory unit 5b is a storage unit that stores data. The vehicle processing unit 5a and the memory unit 5b form a microcomputer. The vehicle unit 5 includes a communication instrument 5c that provides connection to the communication system 6. The vehicle unit 5 includes a camera 5d for picking up an image of an area around the vehicle 4. The camera 5d picks up an image of an area forward of the vehicle. The camera 5d is capable of shooting a still image or a movie. The camera 5d supplies a raw image by picking up an image of a scene forward of the vehicle 4. The vehicle unit 5 implements a vehicular imaging unit. The vehicle unit 5 includes a display 5e.

The vehicle unit 5 includes a plurality of detectors 5f. The plurality of detectors 5f include a sensor required for the navigation unit. For example, the plurality of detectors 5f may include a satellite positioning unit for detecting a current location of the vehicle 4. The plurality of detectors 5f include a sensor for detecting the behavior of the vehicle 4. For example, the plurality of detectors 5f may include a speed sensor for detecting the running speed of the vehicle 4 and a brake sensor for detecting a manipulation of a brake unit. The plurality of detectors 5f include a sensor for detecting the behavior of the driver. For example, the plurality of detectors 5f may include an indoor camera for picking up an image of the face of the driver, a microphone for detecting the voice of the driver, and a heartbeat sensor for detecting the heartbeat of the driver.

The vehicle unit 5 is a navigation unit mounted in the vehicle 4. The vehicle unit 5 not only displays a map on the display 5e, but also indicates the location of the vehicle 4 on the map. Further, in response to a request from a user of the vehicle 4, the vehicle unit 5 provides route guidance to indicate a route from the current location to a destination. The vehicle unit 5 has a function of selecting a route from the current location to a destination. The vehicle unit 5 displays a selected route on the map displayed on the display 5e and provides visual or audio assistance to guide the driver to run the vehicle along the selected route.

The center unit 3 and the vehicle unit 5 are both formed by an electronic control unit (ECU). The ECU includes a processing unit and a memory unit. The memory unit acts as a storage medium for storing a program. The ECU is implemented by a microcomputer having a computer-readable storage medium. The storage medium provides non-transitory storage of a computer-readable program. The storage medium may be implemented by a semiconductor memory or by a magnetic disk. When executed by the ECU, the program causes the ECU to function as a unit described in this description and execute a control method described in this description, as described later. A device implemented by the ECU may be referred to as a functional block or module that performs predetermined functions. In this application, the Japanese word "Shudan" is translated or referred to as a device (or means) in English.

Figure 4:
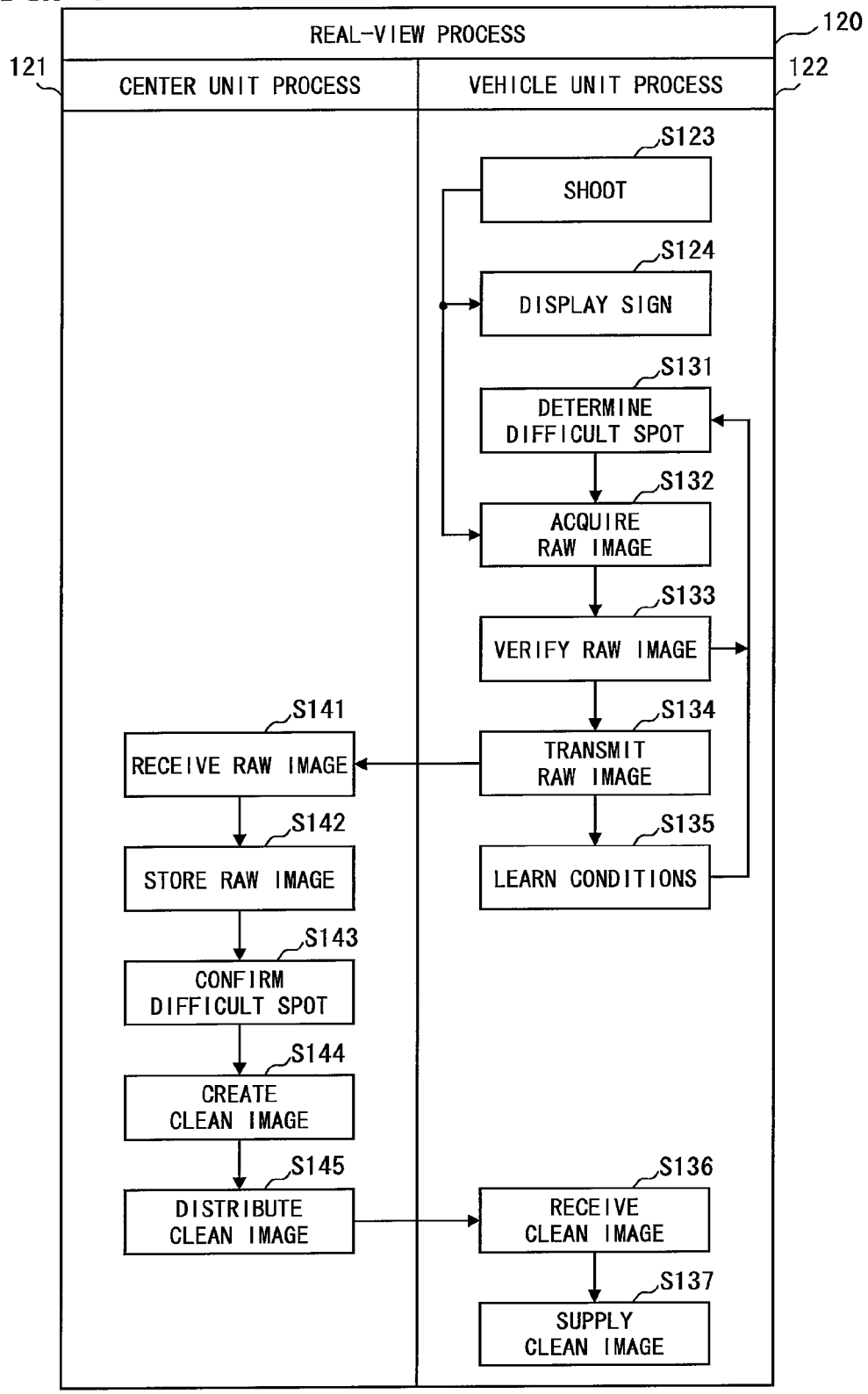
FIG. 4 is a flowchart illustrating a control process according to the first embodiment.

FIG. 4 is a flowchart illustrating a real-view process 120 related to real-view navigation provided by the vehicular navigation system 1. In real-view navigation, an image picked up by a preceding vehicle is supplied to a succeeding vehicle. More specifically, a clean image is distributed to the succeeding vehicle. The clean image is obtained by erasing the other vehicles, or more preferably, by erasing pedestrians and other moving objects from the image picked up by the preceding vehicle. A raw image is collected from a plurality of preceding vehicles in order to create the clean image. Further, in real-view navigation, a part containing information useful for driving assistance is cut out from a scene forward of the vehicles and displayed on the internal display 5e. The real-view process 120 includes a center unit process 121, which is performed by the center unit 3, and a vehicle unit process 122, which is performed by the vehicle unit 5.

In this application, the word "information" is used not only as an uncountable noun but also as a countable noun.

It is noted that a flowchart or the processing of the flowchart in the present application includes sections (also referred to as steps), each of which is represented, for instance, as S123. Further, each section can be divided into several sub-sections while several sections can be combined into a single section. Furthermore, each of thus configured sections can be also referred to as a device, means, module, or a processor. Each or any combination of sections explained in the above can be achieved as (i) a software section in combination with a hardware unit (e.g., computer) or (ii) a hardware section, including or not including a function of a related apparatus; furthermore, the hardware section (e.g., integrated circuit, hard-wired logic circuit) may be constructed inside of a microcomputer.

In S123, an image of an area forward of the vehicle 4 is picked up. S123 may include a selection process in which only a usable image is selected from a plurality of images picked up by the camera 5d. For example, S123 may include a selection process for discarding an image of a windshield wiper, which removes raindrops on a windshield of the vehicle.

In S124, a process is performed to let the display 5e display a road sign that is visible ahead of the vehicle 4. In this process, the road sign is recognized from an image picked up by the camera 5d. For example, this process recognizes a sign that is posted at a preceding intersection to indicate destinations. Further, this process cuts out a partial image showing the road sign from the raw image and causes the display 5e to display an enlargement of the cut-out image. This assists the driver in recognizing the road sign.

In S131, it is determined that the vehicle 4 has encountered a difficult spot. The difficult spot is a spot on a road that makes it difficult for the driver to understand a road structure or a course (or an approach path). The difficult spot may include a difficult intersection, that is, a road fork. The difficult spot may include a road fork having many forks or a road fork having a special fork angle. Such an intersection may be referred to as a difficult intersection. Further, the difficult spot may also include an entrance to a destination of the vehicle 4, an entrance to a parking lot, and other spots that are difficult to find during driving. The determination can be automatically made. Further, a switch to be manipulated when the driver determines that a difficult spot is encountered may be additionally installed. Thus, the difficult spot may be determined in response to an input manipulation performed through the switch.

If an abnormal event is detected, it is possible to determine that the vehicle 4 is at a difficult spot. If, for example, the driver encounters an intersection and is at a loss which path to choose, such a situation may be detected to determine whether a difficult spot is encountered. The situation where the driver is at a loss which path to choose can be determined by the behavior of the vehicle 4 or of the driver. The behavior of the vehicle 4 may include a driving manipulation of the vehicle 4 by the driver, the status of the vehicle 4, and the acceleration and deceleration of the vehicle 4.

In some cases, the difficult spot may be determined based on a driving manipulation of the vehicle 4 by the driver or with the behavior of the vehicle 4. A typical example of a vehicle behavior indicative of a difficult spot is abrupt deceleration, that is, sudden braking, within a candidate range representing a candidate spot such as an intersection. Another typical example is bringing the vehicle to a stop within the candidate range. Still another typical example is meandering manipulation within the candidate range. Further, the difficult spot may be determined based on a combination of a plurality of vehicle behaviors, such as deceleration and meandering.

In order to determine the difficult spot, an observed vehicle behavior is compared against a predefined standard behavior. If the observed vehicle behavior is different from the standard behavior, it can be determined that a difficult spot is encountered. The standard behavior may be predefined based on a behavior of many vehicles at a difficult spot. The standard behavior may be referred to as a reference behavior. The standard behavior may be adjusted to match the personality of a specific driver. The adjustment may be made manually or through a later-described learning process.

In some cases, the difficult spot may be determined based on the behavior of the driver. For example, whether the driver has encountered a difficult spot may be determined based on the behavior of the driver, such as the movement of the body of the driver, the voice of the driver, or the heartbeat of the driver. More specifically, the facial expression of the driver or the movement of the eyes or head of the driver may be used for determination purposes. Further, it is possible to make use of a voice that is uttered by the driver when the driver has chosen a wrong path. More specifically, it is possible to make use of words, such as "damn" and "oops," that are spoken by the driver when the driver is astonished. A drastic change in the number of heartbeats may also be used for determination purposes.

In order to determine the difficult spot, an observed behavior of the driver is compared against a predefined standard behavior. If the observed driver behavior is different from the standard behavior, it can be determined that a difficult spot is encountered. The standard behavior may be predefined based on a behavior of many drivers at a difficult spot. The standard behavior may be referred to as a reference behavior. The standard behavior may be adjusted to match the personality of a specific driver. The adjustment may be made manually or through the later-described learning process.

In some cases, the difficult spot may be determined based on a deviation of the vehicle 4 from a route preselected for route guidance. If the vehicle 4 deviates from the preselected route at an intersection while route guidance is provided by the vehicle unit 5, that intersection may be a difficult intersection.

S131 implements a determination section that determines, on a road, a difficult spot that makes it difficult for the driver to understand a road structure or a course. The determination section determines the difficult spot by comparing the vehicle behavior and/or driver behavior against the standard.

As the difficult spot is automatically determined, an image for driving assistance can be automatically supplied.

In S132, an image picked up by shooting a difficult spot is acquired as a raw image. This image is a raw image picked up by the camera 5d on the vehicle 4. The raw image includes at least one still image that is picked up by the camera 5d immediately before the difficult spot is reached. It is highly likely that the raw image shows the difficult spot in such a manner as to reveal its road structure. The raw image may include a plurality of still images or a movie that is picked up in a predetermined segment before the difficult spot is reached or in a predetermined segment containing the difficult spot. The raw image may be selectively obtained from a plurality of still images or a movie that is picked up within a predetermined running period or a predetermined running distance containing the difficult spot.

In S133, the difficult spot determined in S131 is verified based on the raw image. This verification also serves as a process of determining whether the spot shown in the raw image is a difficult spot. The determination of a difficult spot in S131 may include an error. If the possibility of being a difficult spot is lower than a predetermined value, the raw image is discarded in S133 so that processing returns to S131 by skipping a subsequent process. The process performed in S133 can increase the accuracy of determining the difficult spot.

A vehicle behavior, a driver behavior, or the deviation from a route may be observed at a difficult spot as an event indicative of a difficult spot; such an event may occur due to a different factor. A factor irrelevant to a difficult spot may be shown in the raw image picked up at an encountered spot. An object indicative of a factor irrelevant to a difficult spot may be called an error object. The determination section can verify the determination by checking whether an error object is shown in the raw image.

For the above process, error objects that may be shown in the raw image due to a factor irrelevant to a difficult spot are pre-registered and stored in the vehicular navigation system 1. Further, the raw image is processed to determine whether an error object is shown in the raw image. If an error object is shown in the raw image, the determination made in S131 can be determined to be in error. Thus, an error process can be performed. If the determination made in S131 is determined to be in error, the raw image obtained in S132 can be discarded. If the determination made in S131 cannot be determined to be in error, subsequent processes including a supply process are performed. The supply process is performed to supply an image for providing assistance in driving at the difficult spot. In other words, if a verification section verifies that the determination of a difficult spot by the determination section is correct, the subsequent supply process is performed. If the determination of a difficult spot is not verified to be correct, the verification section discards the raw image. If the verification section does not verify that the determination of a difficult spot is correct, the subsequent supply process will not be performed.

When a difficult spot is determined based on a vehicle behavior or driver behavior, there is a possibility that the determination is incorrect. The reason is that the vehicle behavior or driver behavior observable at a difficult spot may be caused by a different factor. For example, sudden braking at an intersection may be caused by various factors such as a difficult intersection, the sudden braking of a preceding vehicle, and an approaching pedestrian. A typical example of an error object is a brake lamp that illuminates its unduly large area in red to indicate the sudden braking of a preceding vehicle running close to the host vehicle. Another typical example of an error object is a pedestrian walking close to the host vehicle.

In S134, the raw image is transmitted from the vehicle unit 5 to the center unit 3. S134 implements a transmission section that transmits the raw images from the vehicle unit 5 to the center unit 3. One or more raw images are transmitted. In S134, images showing one difficult spot or a plurality of difficult spots can be transmitted.

The position of the camera 5d mounted in the vehicle 4 may vary from one vehicle 4 to another. Further, the model of the camera 5d may vary from one vehicle 4 to another. Information about imaging conditions, such as the model, position, and imaging range of the camera 5d, is added to the image transmitted in S134. The imaging conditions may include information about the running lane used at the time of imaging and the date and time. This information is used to recognize the raw image difference between a plurality of vehicles 4 and make image corrections.

The location of the vehicle 4 that prevails when the raw image is picked up may vary from one vehicle 4 to another. Information about such an imaging location is added to the image transmitted in S134. For example, the added information indicates the distance between the location at which the raw image is picked up and a standard spot such as the center of an intersection. The above information is used to recognize the raw image difference between a plurality of vehicles 4 and make image corrections.

In the process performed in S134, the existence of a difficult spot and its location are also reported to the center unit 3. Therefore, the process enables the center unit 3 to know the existence of a difficult spot. Further, in response to the report of the existence of a difficult spot, the center unit 3 can perform a process of supplying assistance information to a succeeding vehicle 4. The assistance information provides assistance to the driver at a difficult spot.

In S135, the learning process is performed to correct the standard for determining the difficult spot encountered in S131. S135 implements a learning section that corrects the standard based on the vehicle behavior and/or driver behavior observed at the difficult spot. S135 detects a situation where the possibility of being a difficult spot is higher than a predetermined level, and corrects the standard indicative of a difficult spot based on the vehicle behavior or driver behavior observed in the detected situation. The standard indicative of a difficult spot is given by a threshold value or by a behavior corresponding to the difficult spot. The vehicle behavior and driver behavior observed when the driver is at a loss which path to choose at an intersection are dependent on the driver. The above process increases the accuracy of determining the difficult spot.

An example of standard correction can be explained by a situation where a difficult spot is indicated based on a comparison between a behavior observed by a sensor and a predetermined standard value. For example, a standard correction is made in a situation where a difficult spot is determined when a detected behavior exceeds the predetermined standard value. In such a situation, the standard value is corrected based on a behavior observed when the possibility of being a difficult spot is high.

In one example, the standard value of the amount of brake manipulation for determining a difficult spot is corrected based on the amount of brake manipulation observed at a difficult spot. If the observed amount of brake manipulation is smaller than a currently used standard value, the standard value may be decreased for correction. If the observed amount of brake manipulation is greater than the currently used standard value, the standard value may be increased for correction.

In another example, the standard value of steering width for determining a difficult spot is corrected based on the steering width of meandering observed at a difficult spot. If the observed steering width is smaller than a currently used standard value, the standard value may be decreased for correction. If the observed steering width is greater than the currently used standard value, the standard value may be increased for correction.

In yet another example, the standard value of a change in the number of heartbeats for determining a difficult spot is corrected based on a change in the number of heartbeats of the driver, which is observed at a difficult spot. If the observed change in the number of heartbeats is smaller than a currently used standard value, the standard value may be decreased for correction. If the observed change in the number of heartbeats is greater than the currently used standard value, the standard value may be increased for correction.

Another example of standard correction is a situation where a driver behavior observed when the possibility of being a difficult spot is high is set as a "standard indicative of a difficult spot" that is unique to a specific driver. In one example, the standard is corrected so that a driver's voice observed at a difficult spot is set as a standard voice for determining a difficult spot. One driver may utter the word "damn" at a difficult spot. Another driver may utter the word "oops" at a difficult spot. Thus, the standard fit for the personality of the driver can be defined by setting the word "damn" as the standard in the former case or by setting the word "oops" as the standard in the latter case.

In S141, the center unit 3 receives the raw image transmitted from each of a plurality of vehicle units 5. In S142, the received raw images are stored in the memory unit 3b. When the raw images are stored, they are sorted by the spot of image pickup. For each spot, a plurality of different raw images can be stored.

S141 and S142 implement an acquisition section that acquires the raw images picked up at a predetermined spot, that is, a difficult spot. The acquisition section acquires information indicative of imaging conditions for individual raw images. The acquisition section is implemented by S141, and includes a center reception section that receives the raw images transmitted from the transmission section. The acquisition section is implemented by S142, and includes a storage section that stores a plurality of raw images.

In S143, the center unit 3 performs a process of confirming whether a spot shown in the raw images is appropriate as a difficult spot for which a clean image should be provided. This confirmation process can be performed by an operator who views the raw images and makes a determination. Further, this confirmation process may include a process of determining whether the number of a plurality of raw images that are stored for one spot exceeds a predetermined threshold value. If the determination is affirmative, it signifies that a plurality of vehicles 4 have determined that the spot is a difficult spot. In this instance, it is concluded that the spot should be handled as a difficult spot, and that a later-described clean image should be provided for the spot. If it is concluded in S143 that the spot is appropriate as a difficult spot, S144 is performed. If it is concluded in S143 that the spot is inappropriate as a difficult spot, S144 is not performed for the moment.

S143 implements a confirmation section. The confirmation section confirms that the spot shown in the raw images is appropriate as a spot for which a clean image should be created. If the confirmation section confirms that the spot shown in the raw images is appropriate, a creation section is permitted to create a clean image. When the predetermined threshold value is exceeded by the number of stored raw images, the confirmation section confirms that an encountered spot is appropriate as a spot for which a clean image should be created.

In S144, a clean image is created based on the raw images. In S144, a clean image of a difficult spot is created. The created clean image does not show moving objects such as pedestrians and the other vehicles. The creation of a clean image may be accomplished by selecting a raw image showing no moving objects from a plurality of raw images stored for one spot. The creation of a clean image may also be accomplished by erasing moving objects, such as pedestrians and the other vehicles, from a raw image.

The clean image can be created by allowing the operator to process and correct the raw images. In such a manual process, the clean image is created based on a plurality of raw images stored for a subject spot. The clean image can also be created by executing an image processing program. The image processing program automatically creates one or more clean images based on a plurality of raw images.

A process of generating the clean image includes a plurality of processes, namely, a process of selecting a basic image, a process of recognizing a moving object in the basic image, a process of selecting another raw image that supplies a background image for erasing the moving object, and a process of combining the basic image with the other raw image. No matter whether the manual process or the automatic process based on the image processing program is performed, the images are temporarily stored in the memory unit 3b.

The selection of the basic image can be accomplished by checking a plurality of raw images to select a raw image that indicates a difficult spot in an explicit manner. For example, a raw image showing an area within a predetermined distance from a difficult spot, such as a standard point of a difficult intersection, can be selected as the basic image. Further, a raw image satisfying predetermined conditions defined based on the width of a road connected to a difficult intersection can be selected as the basic image. A moving object in the basic image can be recognized based on a predefined standard shape representing a vehicle or a pedestrian.

The selection of the other raw image can be accomplished by selecting a raw image that is similar to the basic image. For example, a raw image showing an area within a predetermined distance from a spot at which the basic image is picked up may be selected as the other raw image. Further, a raw image showing a road sign or other characteristic object whose location and shape are similar to those in the basic image may be selected as the other raw image. More specifically, a stop line or a crosswalk may be utilized for the selection of the other raw image. Moreover, image processing may be performed to recognize the range of an intersection.

When the basic image is to be combined with another image (a part of an image), a correction process is performed to make image corrections based on the imaging location and make shadow corrections based on the date and time. The image corrections based on the imaging location may include a left-right correction based on the difference in the running lane used when the raw image is picked up. The image corrections based on the imaging location may include a height correction based on the difference in the height of the camera 5d. When a part of the other raw image is combined with the basic image in such a manner as to erase a moving object, a clean image from which at least one moving object is erased is generated.

S144 implements the creation section, which creates a clean image by erasing at least a part of moving objects, such as another vehicle and/or a pedestrian, from a raw image. The clean image is created as an image that provides assistance in driving at the difficult spot. The creation section creates the clean image based on a plurality of raw images. The creation section combines a plurality of raw images based on imaging conditions attached to the individual raw images. In order to create the clean image from which moving objects are erased, the creation section combines a part of a raw image with a portion of another raw image that shows moving objects. Therefore, even when the moving objects are erased, an image showing a scene similar to an actual one is supplied.

In S145, the clean image is distributed from the center unit 3 to the vehicle unit 5. S145 is provided in the center unit 3 to implement a distribution section that distributes the clean image to the vehicle unit 5. The clean image can be distributed to a plurality of vehicles 4. Further, the clean image can be distributed in response to a request from the vehicle 4. Furthermore, the clean image may be distributed to a vehicle 4 that is about to arrive at a difficult spot.

In S136, the vehicle unit 5 receives the clean image. S136 implements a vehicle reception section that receives the clean image distributed from the distribution section and stores the clean image in the memory unit 5b.

In S137, the vehicle unit 5 presents the clean image to the driver. More specifically, the clean image appears on the display 5e. The vehicle unit 5 uses the clean image to provide route guidance. For example, the vehicle unit 5 displays the clean image on the display 5e before the vehicle 4 arrives at a difficult spot.

If, in the above instance, route guidance is being provided, a guidance mark can be displayed over the clean image. The guidance mark is an arrow indicative of a route or a multi-head arrow indicative of a plurality of selectable paths at a road fork. An image formed of the clean image and the guidance mark may be referred to as a guidance image. The guidance mark can be combined with the clean image at the vehicle unit 5. The guidance mark may be combined with the clean image at the center unit 3. The clean image and the guidance image are images for driving assistance.

S132-S134, S141-S145, and S136-S137 implement a supply section that supplies an image for providing assistance in driving at a difficult spot based on raw images picked up at the difficult spot. In the present embodiment, the supply section is implemented at least by the creation section 144, the distribution section 145, the vehicle reception section 136, and a display section 137. S137 implements the display section that causes the display 5e to display the clean image, which is stored in the memory unit 5b, when the difficult spot is encountered.

S131-S137 and S141-S145 provide an image distribution process that supplies an image for providing assistance in driving at a difficult spot based on raw images picked up at the difficult spot. In the present embodiment, a mark display process provided by S124 or the image distribution process provided by S131-S145 implements a utilization section that utilizes an image picked up in S123.

Figure 5:
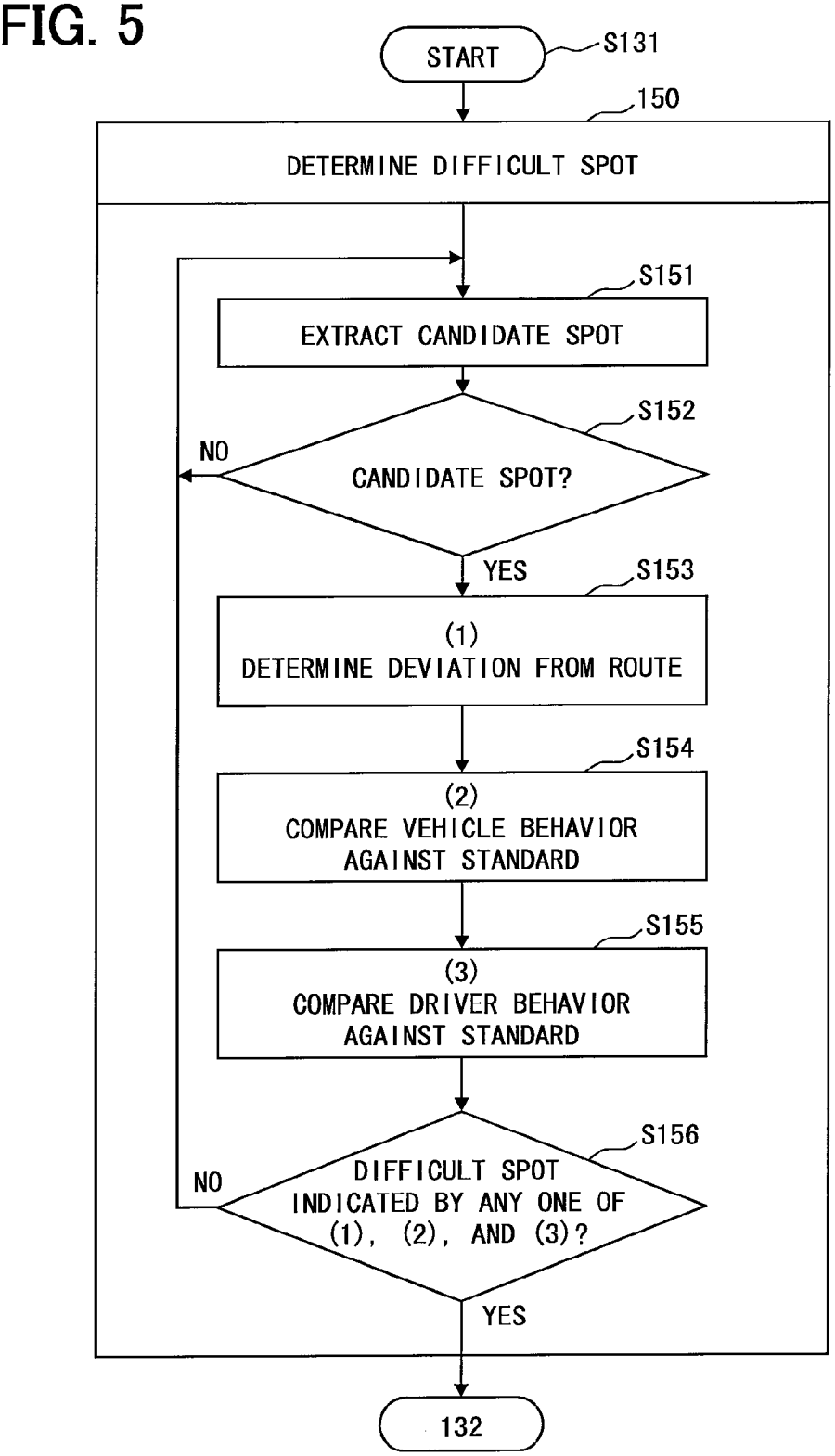
FIG. 5 is a flowchart illustrating a control process according to the first embodiment.

FIG. 5 shows a process 150 of determining a difficult spot such as a difficult intersection. The process 150 is an example of S131. The process 150 is performed by the vehicle unit 5.

In S151, a candidate spot is extracted. The candidate spot can be a difficult spot. When a difficult intersection is to be determined, a difficult intersection that may cause the driver to be at a loss which path to choose is extracted from a plurality of intersections registered in the memory unit 5b.

In S152, a check is performed to determine whether the vehicle 4 has arrived at the candidate spot. If the determination is negative, processing returns to S151. If the determination is affirmative, processing proceeds to S153.

In S153, a check is performed to determine whether the vehicle 4 has deviated from a route preselected for route guidance at the candidate spot. If the vehicle 4 deviates from a preselected route at an intersection, it is highly probable that the intersection is a difficult spot. If the vehicle 4 has deviated from the preselected route in S153, it is determined that the candidate spot is a difficult spot.

In S154, a vehicle behavior observed at the candidate spot is compared against a standard. In S154, a check is performed to determine whether the observed vehicle behavior is deviated from the standard. If the observed vehicle behavior is deviated from the standard, it is determined that the candidate spot is a difficult spot.

In S155, a driver behavior observed at the candidate spot is compared against a standard. In S155, a check is performed to determine whether the observed driver behavior is deviated from the standard. If the observed driver behavior is deviated from the standard, it is determined that the candidate spot is a difficult spot.

In S156, a check is performed to determine whether any one of the results of determination processes (1), (2), and (3) in S153-S155 indicates that the candidate spot is a difficult spot. If any one of the results of determination processes (1), (2), and (3) indicates that the candidate spot is a difficult spot, processing proceeds to S132. If the determination in S156 is negative, processing returns to S151.

Figure 6:
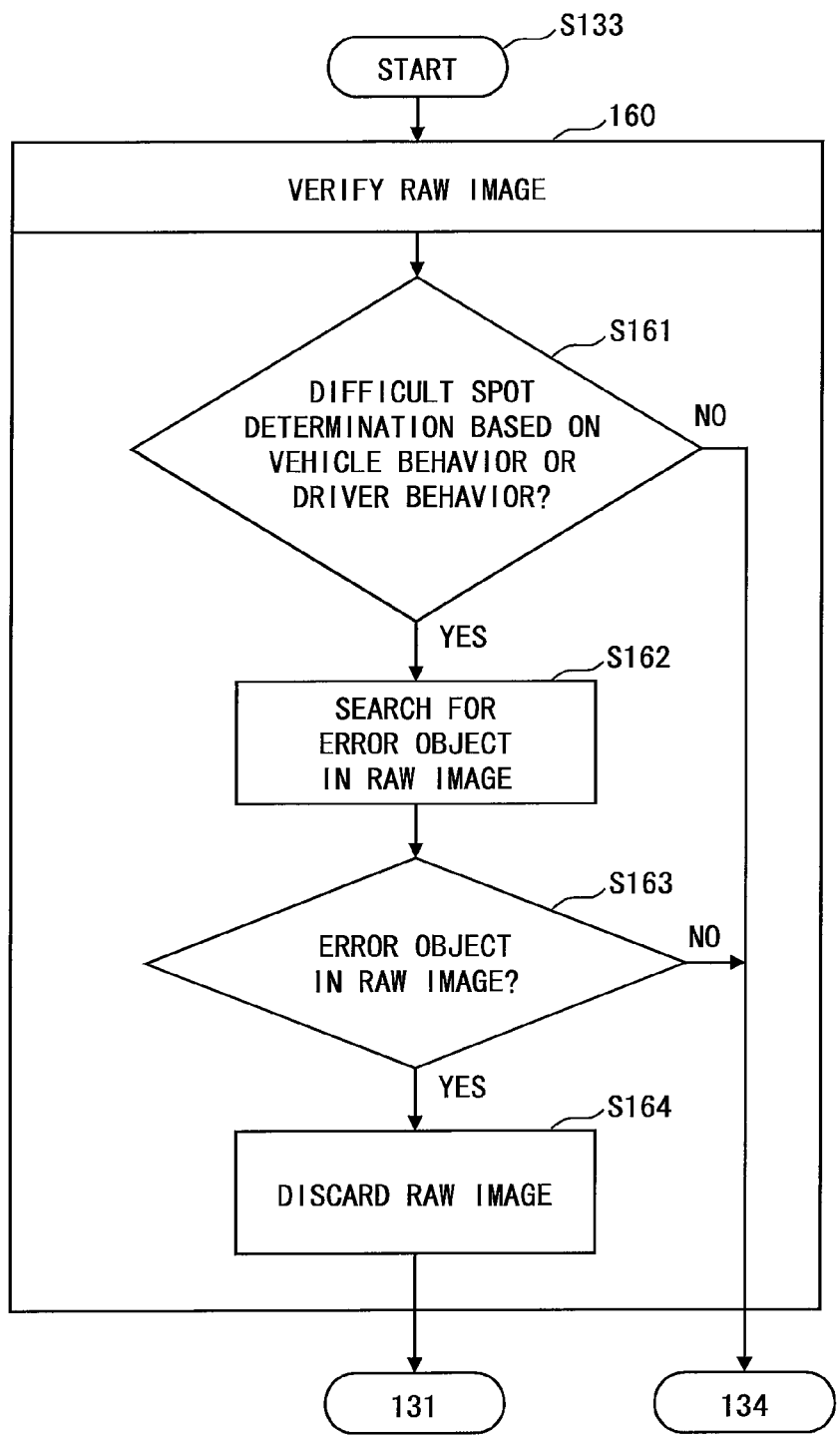
FIG. 6 is a flowchart illustrating a control process according to the first embodiment.

FIG. 6 shows a process 160 of verifying the determination of the difficult spot based on a raw image. The process 160 is an example of S133. The process 160 is performed by the vehicle unit 5.

In S161, a check is performed to determine whether the difficult spot is detected due to a vehicle behavior or a driver behavior. If the determination in S154 or S155 is affirmative, the determination in S161 is affirmative. If the determination in S161 is negative, processing proceeds to S134. If the determination in 161 is affirmative, processing proceeds to S162.

In S162, an image recognition process is performed to search the raw image for an error object. In S163, a check is performed to determine whether the raw image shows an error object. If the determination in S163 is negative, processing proceeds to S134. If the determination in S163 is affirmative, processing proceeds to S164. In S164, the raw image acquired in S132 is discarded. Upon completion of S132, processing returns to S131.

Figure 7:
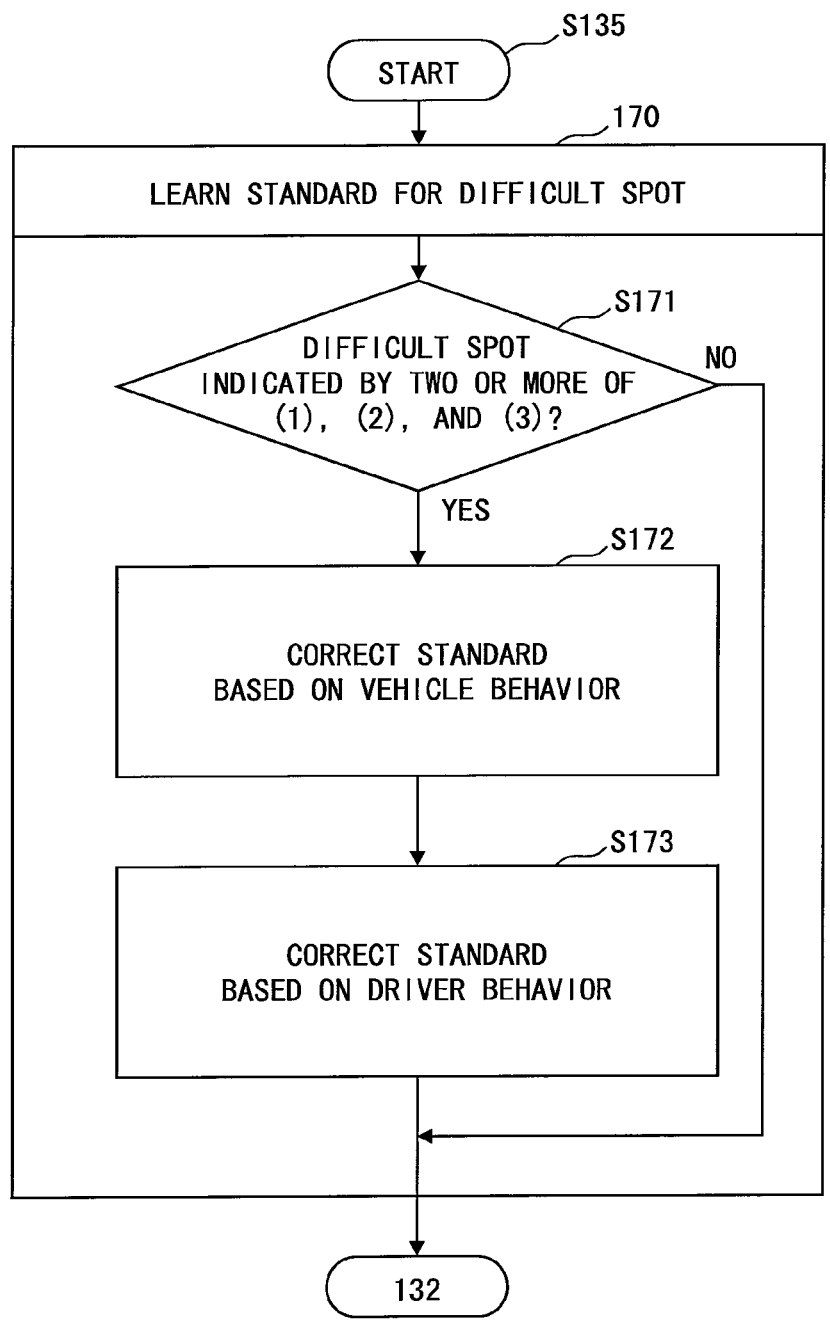
FIG. 7 is a flowchart illustrating a control process according to the first embodiment.

FIG. 7 shows a process 170 of learning standards indicative of a difficult spot. The process 170 is an example of S135. The process 170 is performed by the vehicle unit 5.

In S171, a check is performed to determine whether determination processes (1), (2), and (3) in S153-S155 indicate that the candidate spot is a difficult spot. If at least two of determination processes (1), (2), and (3) indicate that the candidate spot is a difficult spot, processing proceeds to S172. If the determination in S171 is negative, processing returns to S132.

In the present embodiment, the determination section implemented by S131 includes a plurality of determination processes, namely, S153-S155. S171 implements a determination section that checks that the correctness of determination of a difficult spot is equal to or higher than a predetermined level. As a result, the learning section makes corrections when the difficult spot is determined by at least two of the plurality of determination processes.

In S172, the standard for the vehicle behavior is corrected based on the vehicle behavior observed at the difficult spot. In S173, the standard for the driver behavior is corrected based on the driver behavior observed at the difficult spot. In S173, a voice of the driver or other driver behavior observed at the difficult spot may be set as the standard.

Figure 8:
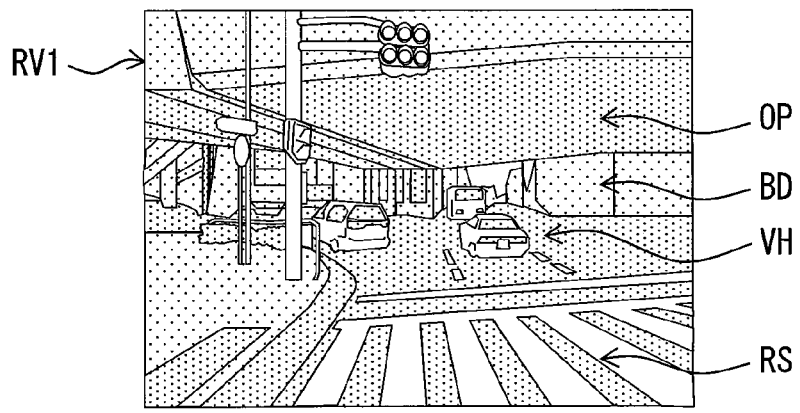
FIG. 8 is a plan view illustrating an example of a raw image according to the first embodiment.
Figure 9:
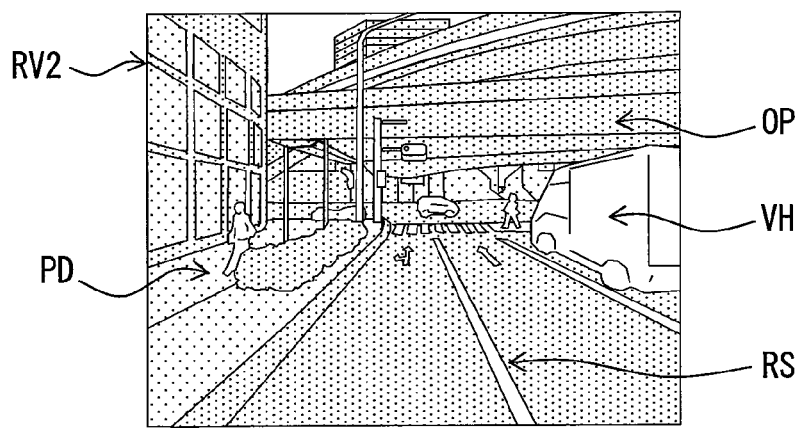
FIG. 9 is a plan view illustrating an example of a raw image according to the first embodiment.

FIGS. 8 and 9 show an example of a raw image, respectively. For purposes of illustration, FIGS. 8 and 9 show a simplified picture derived from an image picked up by the camera 5d. Raw images RV1 and RV2 are images showing the same intersection. The raw images are also referred to as raw views or original views. Raw image RV1 is acquired in response to a determination of a difficult intersection by one vehicle 4. Raw image RV2 is acquired in response to a determination of the difficult intersection by another vehicle 4. Raw images RV1 and RV2 differ in the date and time and the location of image pick-up.

Raw images RV1 and RV2 show a scene at the intersection. As shown in FIGS. 8 and 9, raw images RV1 and RV2 show a road sign RS, a building BD, which is a part of the scene, and an overpass OP, which is a part of the scene. The area of this intersection is large. Therefore, the building BD on the far side looks small. Further, the field of view is obstructed by a traffic light and other installations. Furthermore, the overpass OP covers a large area to darken the overall view. These factors make it difficult to recognize individual paths of a road fork.

Raw images RV1 and RV2 show a pedestrian PD and another vehicle VH, which is a moving object. Thus, raw images RV1 and RV2 show different scenes. It is not easy to accurately recognize the shape of the intersection and choose a correct path simply by viewing raw images RV1, RV2.

Figure 10:
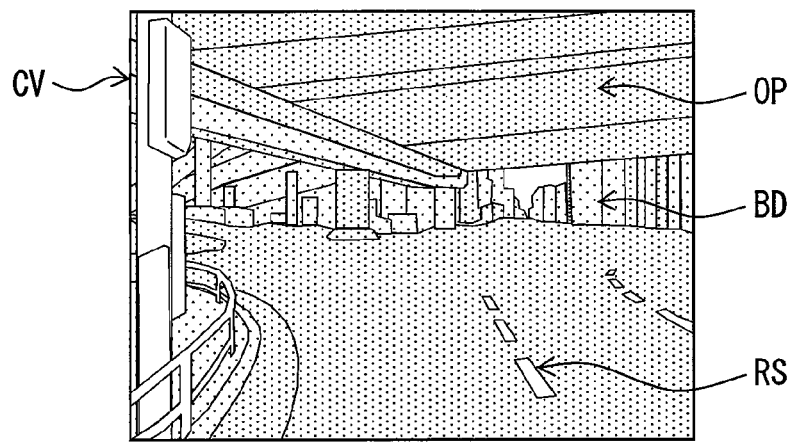
FIG. 10 is a plan view illustrating an example of a clean image according to the first embodiment.

FIG. 10 shows an example of a clean image that is obtained when the center unit 3 combines some images. FIG. 10 shows a high-definition image that is equivalent to an image picked up by the camera 5d and simplified for purposes of illustration. The clean image CV is a combined image obtained in S144. The clean image is also referred to as the clean view. The clean image CV shows the road sign RS as well as the building BD and the overpass OP, which are parts of the scene. The clean image CV shows at least no conspicuous moving object. The clean image CV may show a small moving object that can be recognized as an object similar to the background building BD. The clean image CV is a combined image derived from raw images RV1 and RV2. The clean image CV has about the same high definition quality as raw images RV1 and RV2. The quality of the clean image is closer to photographic quality than a picture showing a building as a schematic block.

Figure 11:
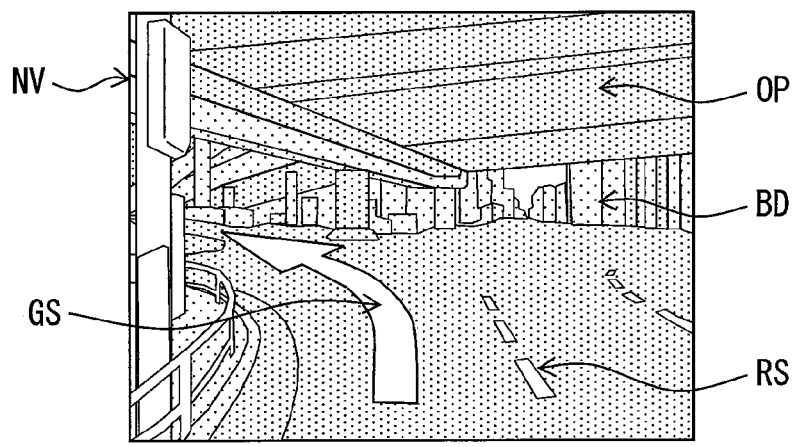
FIG. 11 is a plan view illustrating an example of a guidance image according to the first embodiment.

FIG. 11 shows an example of a guidance image that is displayed on the display 5e by the vehicle unit 5. The guidance image NV displayed on the display 5e has about the same high definition quality as the clean image CV. The guidance image is also referred to as the navigation view. The guidance image NV can have the same image quality as the clean image CV. The guidance image NV additionally shows a guidance sign GS for route guidance. The guidance sign GS is added by a route guidance function of the vehicle unit 5. In the example of FIG. 11, the guidance sign GS shows the direction of movement into one of a plurality of paths of the road fork. The guidance sign GS can be added to the clean image by either the center unit 3 or the vehicle unit 5.

According to the present embodiment, raw images picked up at a difficult spot are used to create an image that provides assistance in driving at the difficult spot. Thus, an image for driving assistance is supplied based on an actual scene at the difficult spot.

In one example, raw images are supplied from preceding vehicles that have passed the difficult spot, and the clean image obtained by combining the raw images is supplied as the guidance image for a succeeding vehicle. The clean image is generated based on a scene at the difficult spot that is visible from the preceding vehicles. Therefore, the guidance image supplied to the driver of the succeeding vehicle provides a view close to an actual view at the difficult spot.

Further, the clean image is created by erasing at least some of the moving objects, such as pedestrians and/or the other vehicles, from the raw images. This decreases the degree of unintelligibility resulting from moving objects. Consequently, the influence of irrelevant moving objects is reduced to supply an image easily understood by the driver.

Alternative Embodiments

A preferred embodiment according to the present disclosure has been described above. However, the present disclosure is not limited to the above-described embodiment and may be variously modified.

For example, functions provided by the control unit may be implemented by software only, by hardware only, or by a combination of hardware and software, as described earlier. For example, the control unit may be formed of an analog circuit.

The foregoing embodiment has been described on the assumption that the clean image created based on a plurality of raw images acquired by a plurality of preceding vehicles 4 passing through a difficult spot is supplied to a succeeding vehicle 4 that will arrive at the difficult spot in the future. In the vehicular navigation system, however, a clean image created based on a plurality of raw images repeatedly acquired by one vehicle 4 may be supplied to the same vehicle 4.

The foregoing embodiment has been described on the assumption that S131-S145 are performed in a decentralized manner by the center unit 3 and the vehicle unit 5. Alternatively, however, the processes may be assigned in a manner different from that in the foregoing embodiment. For example, the center unit 3 may perform some or all of S131-S135. Further, the vehicle unit 5 may perform some or all of S141-S145.

In the foregoing embodiment, S131-S135 are performed in real time while the vehicle 4 is running. Alternatively, however, S131-S135 may be performed after the vehicle 4 has run for a predetermined period of time. In such an alternative embodiment, an additional process is performed to let the memory unit 5b store information observed while the vehicle 4 is running. Further, S131-S135 are performed based on the stored information.

In the foregoing embodiment, the clean image is created by erasing both pedestrians and the other vehicles from raw images. Alternatively, however, the clean image may be created by erasing either the pedestrians or the other vehicles from the raw images.

The foregoing embodiment has been described on the assumption that S124 is performed by the vehicle unit 5 only. Alternatively, however, S124 may be partly performed by the center unit 3. For example, an alternative is to let the memory unit 3b in the center unit 3 collect images of signs and let the center unit 3 select latest and high-quality images of signs from the collected images and distribute the selected images to the vehicle unit 5 for display purposes.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. A vehicular navigation system comprising:
a determination section that determines a difficult road fork from among a plurality of road forks on a road based on at least one behavior of (i) a behavior of a vehicle and (ii) a behavior of a driver of the vehicle, the difficult road fork being a road fork that hinders the driver from properly understanding a structure of a course of the road fork; and
a supply section that, based on a raw image picked up at the difficult road fork, supplies an image for providing assistance in driving at the difficult road fork, the supply section including a creation section that creates a clean image by erasing at least partially a moving object that includes a pedestrian or another vehicle, from the raw image,
the vehicular navigation system further comprising:
a plurality of vehicle units disposed respectively in a plurality of vehicles; and
a center unit communicably connected to the plurality of vehicle units,
wherein:
the vehicle unit includes
a camera that supplies the raw image by picking up an image of an area in front of the vehicle where the vehicle unit is mounted,
the determination section, and
a transmission section that transmits the raw image to the center unit;
the center unit includes
a center reception section that receives the raw image transmitted from the transmission section,
the creation section, and
a distribution section that distributes the clean image to the vehicle units;
the vehicle unit further includes
a vehicle reception section that receives the clean image distributed from the distribution section and stores the clean image in a storage unit, and
a display section that causes a display to display the clean image stored in the storage unit when the difficult road fork is encountered; and
the supply section is implemented by the creation section, the distribution section, the vehicle reception section, and the display section.

2. The vehicular navigation system according to claim 1, wherein:
the supply section includes a storage section that stores a plurality of the raw images; and
the creation section creates the clean image based on the plurality of the raw images.

3. The vehicular navigation system according to claim 2, further comprising:
a confirmation section that permits the creation section to create the clean image when a road fork at which the raw image is picked up is confirmed to be suitable for creating the clean image.

4. The vehicular navigation system according to claim 3, wherein the confirmation section confirms that a road fork is suitable for creating the clean image when a stored number of the raw images picked up at the road fork exceeds a predetermined threshold value.

5. The vehicular navigation system according to claim 2, wherein the creation section
combines a partial image of one raw image of the raw images with a range of different one raw image of the raw images, the range showing the moving object, and
creates the clean image from which the moving object has been erased.

6. The vehicular navigation system according to claim 5, wherein the creation section combines the raw images based on respective imaging conditions for the raw images.

7. A vehicular navigation system comprising:
a determination section that determines a difficult spot on a road by comparing a subject behavior against a standard, the subject behavior being at least one behavior of a behavior of a vehicle and a behavior of a driver of the vehicle, the difficult spot being a spot that hinders the driver from properly understanding a road structure or a course;
a learning section that corrects the standard based on the subject behavior observed at the difficult spot; and
a supply section that, based on a raw image picked up at the difficult spot, supplies an image for providing assistance in driving at the difficult spot, the supply section including a creation section that creates a clean image by erasing at least partially a moving object that includes a pedestrian or another vehicle, from the raw image,
the vehicular navigation system further comprising:
a plurality of vehicle units disposed respectively in a plurality of vehicles; and
a center unit communicably connected to the plurality of vehicle units,
wherein:
the vehicle unit includes
a camera that supplies the raw image by picking up an image of an area in front of the vehicle where the vehicle unit is mounted,
the determination section, and
a transmission section that transmits the raw image to the center unit;
the center unit includes
a center reception section that receives the raw image transmitted from the transmission section,
the creation section, and
a distribution section that distributes the clean image to the vehicle units;

the vehicle unit further includes
   a vehicle reception section that receives the clean image distributed from the distribution section and stores the clean image in a storage unit, and
   a display section that causes a display to display the clean image stored in the storage unit when the difficult spot is encountered; and
the supply section is implemented by the creation section, the distribution section, the vehicle reception section, and the display section,
the vehicular navigation system further includes
   a microphone
wherein the learning section sets the behavior of the driver to be the standard, the behavior of the driver being specific to the driver, and the behavior of the driver being observed via the microphone at the difficult spot.

8. The vehicular navigation system according to claim 7, wherein:
the determination section includes a plurality of determination processes for determining the difficult spot; and
the learning section corrects the standard when the difficult spot is determined by at least two of the plurality of determination processes.

9. The vehicular navigation system according to claim 7, wherein:
the supply section includes a storage section that stores a plurality of the raw images; and
the creation section creates the clean image based on the plurality of the raw images.

10. The vehicular navigation system according to claim 9, further comprising:
a confirmation section that permits the creation section to create the clean image when a spot at which the raw image is picked up is confirmed to be suitable as a spot for creating the clean image.

11. The vehicular navigation system according to claim 10,
wherein the confirmation section confirms that a spot is suitable for creating the clean image when a stored number of the raw images picked up at the spot exceeds a predetermined threshold value.

12. The vehicular navigation system according to claim 9, wherein the creation section
   combines a partial image of one raw image of the raw images with a range of different one raw image of the raw images, the range showing the moving object, and
   creates the clean image from which the moving object has been erased.

13. The vehicular navigation system according to claim 12,
wherein the creation section combines the raw images based on respective imaging conditions for the raw images.

14. The vehicular navigation system according to claim 7, wherein
the difficult spot is a difficult road fork being a road fork that hinders the driver from properly understanding a structure or a course of the road fork; and
the determination section determines the difficult road fork from among a plurality of road forks on the road by comparing the subject behavior against the standard.

15. A vehicular navigation system comprising:
a determination section that determines a difficult spot on a road based on at least one behavior of (i) behavior of a vehicle and (ii) a behavior of a driver of the vehicle, the difficult spot being a spot that hinders the driver from properly understanding a road structure or a course;
a verification section that verifies the determining of the determination section by determining whether a raw image picked up at the difficult spot shows an error object, the error object being to be shown in the raw image due to a factor irrelevant to the difficult spot; and
a supply section that, based on the raw image, supplies an image for providing assistance in driving at the difficult spot when the verification section verifies that the determining of the difficult spot is correct,
wherein:
the error object corresponds to at least either (i) a lamp of a vehicle preceding the vehicle, the lamp illuminating in red, or (ii) a pedestrian walking close to the vehicle; and
the verification section discards the raw image picked up at the difficult spot that shows the error object and the supply section skips the raw image that is discarded, when the determining of the difficult spot is not verified to be correct.

16. The vehicular navigation system according to claim 15,
wherein the supply section includes a creation section that creates a clean image by erasing at least partially a moving object that includes a pedestrian or another vehicle, from the raw image.

17. The vehicular navigation system according to claim 16,
wherein:
the supply section includes a storage section that stores a plurality of the raw images; and
the creation section creates the clean image based on the plurality of the raw images.

18. The vehicular navigation system according to claim 17, further comprising:
a confirmation section that permits the creation section to create the clean image when a spot at which the raw image is picked up is confirmed to be suitable as a spot for creating the clean image.

19. The vehicular navigation system according to claim 18,
wherein the confirmation section confirms that a spot is suitable for creating the clean image when a stored number of the raw images picked up at the spot exceeds a predetermined threshold value.

20. The vehicular navigation system according to claim 17,
wherein the creation section
   combines a partial image of one raw image of the raw images with a range of different one raw image of the raw images, the range showing the moving object, and
   creates the clean image from which the moving object has been erased.

21. The vehicular navigation system according to claim 20,
wherein the creation section combines the raw images based on respective imaging conditions for the raw images.

22. The vehicular navigation system according to claim 16, further comprising:
a plurality of vehicle units disposed respectively in a plurality of vehicles; and
a center unit communicably connected to the plurality of vehicle units,
wherein:
the vehicle unit includes
   a camera that supplies the raw image by picking up an image of an area in front of the vehicle where the vehicle unit is mounted,
   the determination section, and a transmission section that transmits the raw image to the center unit;

the center unit includes a center reception section that receives the raw image transmitted from the transmission section, the creation section, and a distribution section that distributes the clean image to the vehicle units;

the vehicle unit further includes a vehicle reception section that receives the clean image distributed from the distribution section and stores the clean image in a storage unit, and a display section that causes a display to display the clean image stored in the storage unit when the difficult spot is encountered; and the supply section is implemented by the creation section, the distribution section, the vehicle reception section, and the display section.

23. The vehicular navigation system according to claim 15, wherein the difficult spot is a difficult road fork being a road fork that hinders the driver from properly understanding a structure or a course of the road fork; and the determination section determines the difficult road fork from among a plurality of road forks on the road by comparing the subject behavior against the standard.

\* \* \* \* \*